United States Patent
Barnard

(10) Patent No.: US 6,868,044 B1
(45) Date of Patent: Mar. 15, 2005

(54) DATA ADAPTIVE INTERFERENCE SUPPRESSION

(75) Inventor: Thomas J. Barnard, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/353,529

(22) Filed: Jan. 29, 2003

(51) Int. Cl.$^7$ .............................................. G01S 3/801
(52) U.S. Cl. ...................... 367/124; 367/129; 367/901; 342/368
(58) Field of Search .............................. 367/901, 124, 367/125, 129; 342/89, 159, 160, 368, 377, 378

(56) References Cited

U.S. PATENT DOCUMENTS

| | | | |
|---|---|---|---|
| 4,283,767 A | * | 8/1981 | Rountree ..................... 367/901 |
| 4,641,259 A | * | 2/1987 | Shan et al. .................. 708/319 |
| 5,528,554 A |   | 6/1996 | Psoch et al. |
| 5,592,178 A | * | 1/1997 | Chang et al. ................ 342/368 |
| 5,822,276 A | * | 10/1998 | Miklovic ..................... 367/901 |
| 5,914,912 A |   | 6/1999 | Yang |
| 6,594,201 B2 | * | 7/2003 | Barnard et al. ............. 367/125 |

* cited by examiner

*Primary Examiner*—Ian J. Lobo
(74) *Attorney, Agent, or Firm*—Plevy, Howard & Darcy, PC

(57) ABSTRACT

A technique for suppressing interference with unknown phase shifts received by an array of sensor elements partitions the array into a plurality of subarrays. Each subarray is processed independently to suppress the interference. Next, the resulting data from each subarray are summed together. This summed data, which effectively represents data provided by the full array with interference suppressed, may be utilized to detect and/or localize a target of interest. Each subarray is processed independently of all other subarrays. No cross-subarray processing is required. This technique is applicable to linear arrays, multi-line arrays, planar arrays, cylindrical arrays, conformal arrays, and spherical arrays. Applicable sensors include acoustic sensors (e.g., sonar, ultrasonic), electromagnetic sensors (e.g. radar), and optical sensors (e.g., infrared, ultraviolet, visible light).

20 Claims, 4 Drawing Sheets

DATA ADAPTIVE INTERFERENCE SUPPRESSION

FIELD OF THE INVENTION

The present invention is generally related to signal processing, and more specifically related to reducing interference signals received by an array of elements.

BACKGROUND

An object of typical sonar and radar systems is to localize a target of interest. Localization typically comprises determining a range and bearing to the target of interest Strong interferers can mask signals representing these targets. Examples of interferers include surface shipping traffic for sonar systems and jammers for radar systems.

To suppress interference, systems have utilized arrays of sensor elements. Given knowledge of the exact phase shifts with respect to the signals received by the elements of the array, notches can be formed in beam patterns and steered in the direction of the interferer to suppress, and even cancel the interfering energy. In practice, these phase shifts are estimated. However, factors such as array motion, uncertainty of the location of elements in the array, uncertainty of the orientation of the array, and environmental affects such as multipath phenomena, produce errors in phase shift estimations.

Errors in phase shift estimation can result in notches being formed that are too wide, thus suppressing energy other than interference energy. This is of particular concern when the interferer is spatially close enough to the target of interest such that the notch actually suppresses the desired signal provided by the target of interest. Also, errors in the phase shift estimation can result in notches that are not steered to the proper direction. An improved scheme for suppressing interference is desired.

SUMMARY

In one embodiment, an apparatus for suppressing at least one interference component of a signal received by an array of signal receivers includes an array parser, a zero padder, a two-dimensional transformer, a localizer, an integrator, and an inverse transformer. The array parser parses the array into a plurality of subarrays. The zero padder zero pads data provided by each of the plurality of subarrays. The two-dimensional transformer performs a two-dimensional transform on the data for each of the plurality of subarrays. The localizer localizes a source of each of the at least one interference component for each of the plurality of subarrays and provides a respective plurality of processed subarray signals. The integrator integrates the plurality of processed subarray signals and provides an integrated array signal. The inverse transformer inverse transforms the integrated array signal.

In another embodiment, a method for suppressing at least one interference component of a signal received by an array of signal receivers includes partitioning the array into a plurality of subarrays. Each of the plurality of subarrays is independently processed to reduce an amplitude of each of the at least one interference component for each of the plurality of subarrays; and to provide a respective plurality of processed subarray signals. The method also includes integrating the plurality of processed subarray signals for providing an integrated array signal.

DETAILED DESCRIPTIONS

Figure 1:
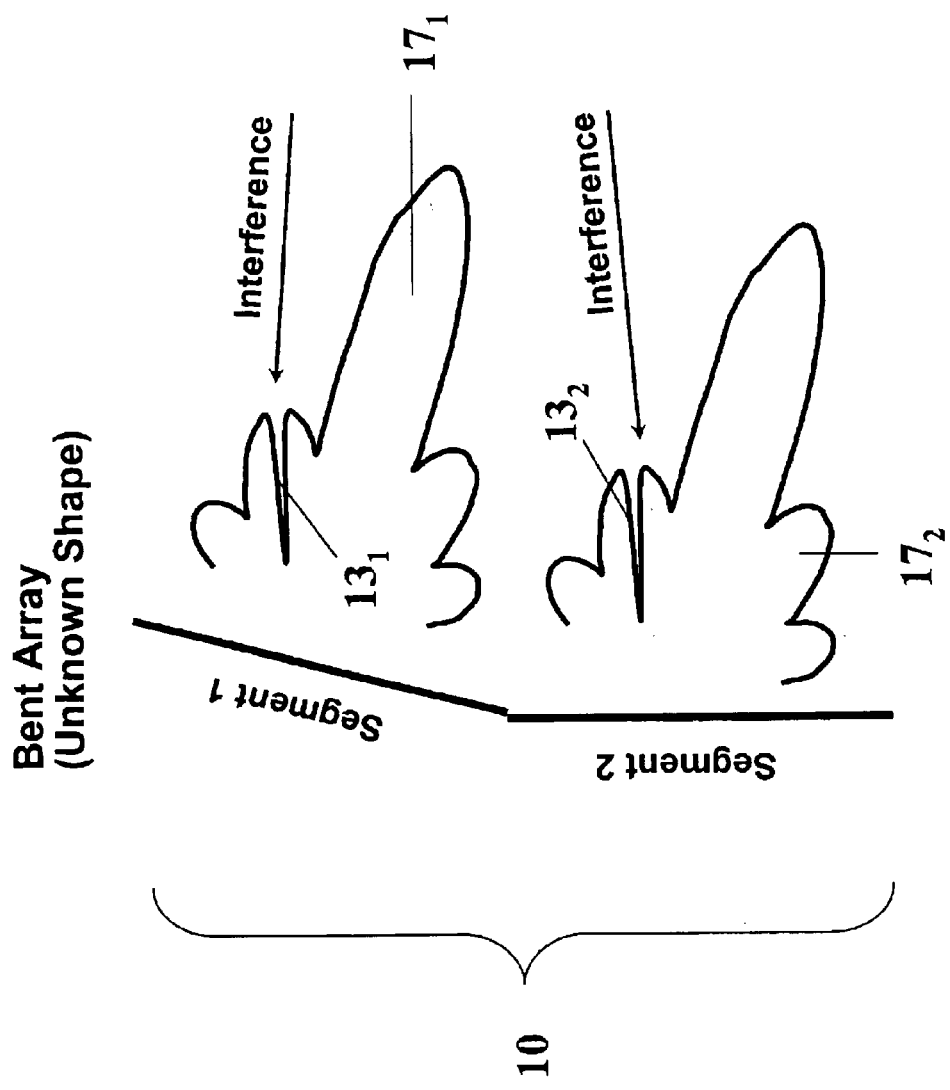
FIG. 1 is a illustration of a linear array having misaligned segments and showing notches steered toward a source of interference.

As described in more detail herein, signals received by an array of sensor elements are processed to suppress interference contained therein. Referring to FIG. 1, there is shown a linear array 10 having misaligned array segments denoted as segment 1 and segment 2. The relative orientation of segment 1 and segment 2 is unknown. Such an array may comprise a towed array of sonar sensors typically housed in a protective sheath or cable and separated a predetermined distance from one another in a linear fashion. A first end of the cable is coupled to signal processing circuitry at a first node that is typically on board a tow platform, such as a ship. The second end (i.e. "wet end") of the array cable extends out from the tow platform in to the water medium. As applied to undersea applications, ownship course changes, environmental forces or other factors tend to impact portions of the array such that relative portions or segments of the array become misaligned. In accordance with an embodiment of the present invention, the linear array 10 is partitioned into a plurality of subarrays (e.g., a first subarray corresponding to segment 1 and a second subarray corresponding to segment 2). Each subarray is processed to suppress the interference, for example by steering a notch $13_1$ in a beam pattern $17_1$ formed from segment 1 and steering a notch $13_2$ in the beam pattern $17_2$ formed from segment 2 toward the source of the interference, as depicted in FIG. 1. After the interference is suppressed for each subarray, the resulting data from each subarray are summed together. That is, the data received by segment 1, weighted by beam pattern $17_1$ and the data received by segment 2, weighted by beam pattern $17_2$ are summed. This summed data, which effectively represents data provided by the full array 10 with interference suppressed, may be utilized to detect and/or localize a target of interest. Each subarray is processed independently of all other subarrays. No cross-subarray processing is required. Various types of arrays are applicable, for example, linear arrays as depicted in FIG. 1, multi-line arrays, planar arrays, cylindrical arrays, conformal arrays, and spherical arrays. Also, applicable sensors include acoustic sensors (e.g., sonar, ultrasonic), electromagnetic sensors (e.g., radar), and optical sensors (e.g., infrared, ultraviolet, visible light).

Figure 2:
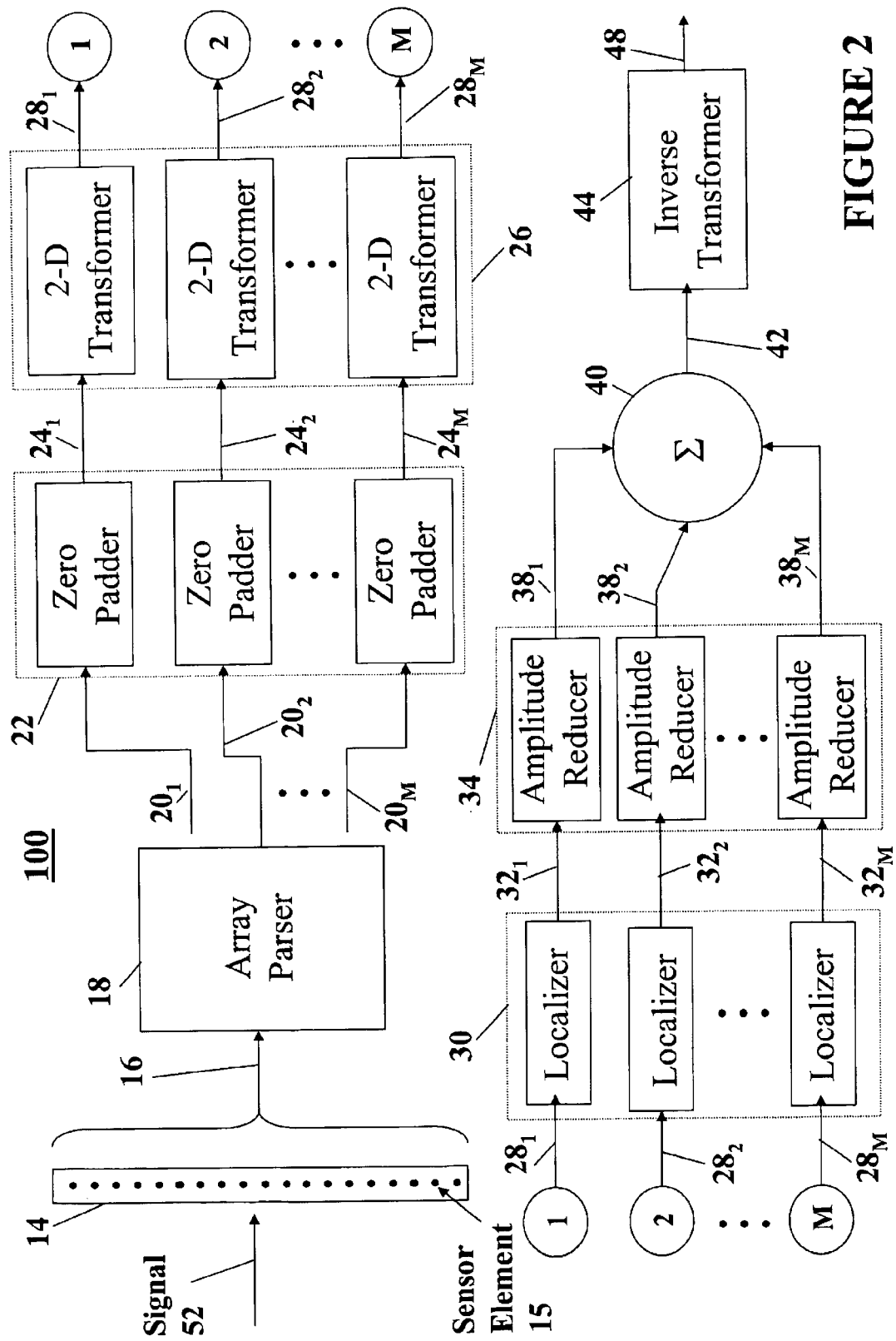
FIG. 2 is a functional block diagram of an apparatus for suppressing interference in accordance with an embodiment of the present invention.

Referring now to FIG. 2, there is shown a functional block diagram of an apparatus 100 for suppressing interference in accordance with an embodiment of the present invention. The array 14 comprises a plurality of sensor elements 15. The array 14 receives a signal 52 and the sensor elements 15 transduce the signal 52 for subsequent processing. The signal 52 may contain an interference component, a component corresponding to a signal of interest, or a combination thereof. The interference component may be provided by a single source or multiple sources of interference. The signal 52 may be an acoustic signal (e.g., sonar), an electromagnetic signal (e.g., radar), an optical signal (e.g., infrared), or a combination thereof. The signal 52 is transduced by the array 14 into signal 16. Signal 16 may be an electrical signal, an electromagnetic signal, an acoustic signal, an optic signal, or a combination thereof. The signal 16 comprises the individual signals provided by each of sensor elements 15. The signal 16 may be in the form of a number of parallel signals, in the form of a multiplexed signal, or a combination thereof. In one exemplary embodiment, the signal 52 is an acoustic signal, and the array 14 transduces the signal 52 into an electrical signal 16, wherein the signal 16 represent K parallel signals, where K is the number of elements 15 in the array 14.

The array parser 18 receives the signal 16 and parses the signal 16 into M subarrays. The data representing the M subarrays is provided to the zero padder 22 by respective signals $20_1$ through $20_M$. Thus data from the first subarray is provided by the signal $20_1$, data from the second subarray is provided by the signal $20_2$, and data from the $M^{th}$ subarray is provided by the signal $20_M$. Each of the signals $20_1$ through $20_M$ is indicative of the data provided by each element of its respective subarray. Each of the signals $20_1$ through $20_M$ may be in the form of a parallel signal, a multiplexed signal, or a combination thereof. The zero padder 22 pads each set of subarray data, represented by signals 201 thorough $20_M$, with zeros and provides zero padded data to the two dimensional transformer 26 via the signals $24_1$ through $24_M$.

Figure 3:
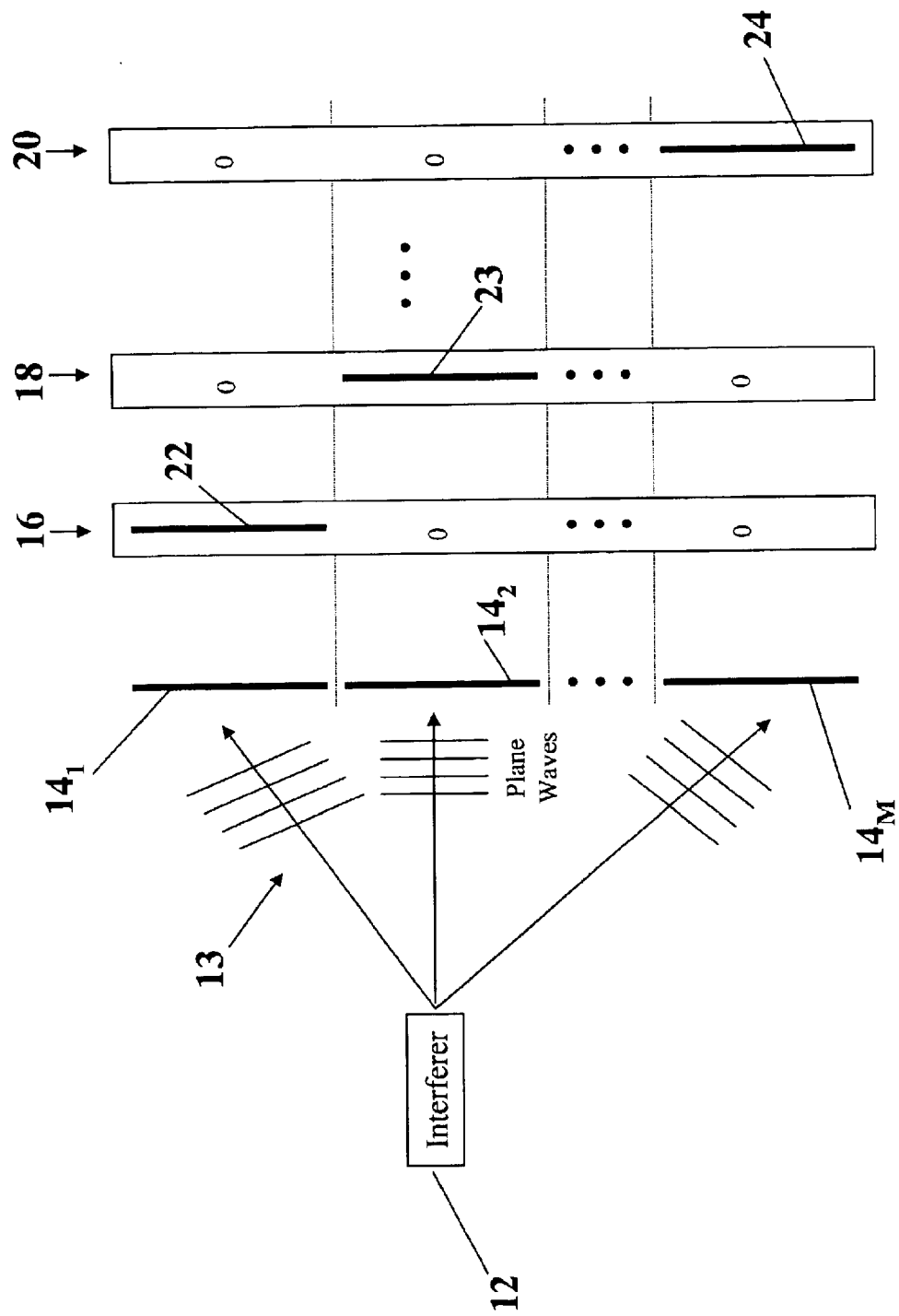
FIG. 3 is an illustration of plurality of subarrays and subsequent subarray processing for suppressing interference in accordance with an embodiment of the present invention.

Refer now to FIG. 3, for the following description of the array parser 18 and the zero padder 22. As shown in FIG. 3, the source of interference 12 provides interference component 13, which is received by the array 14. It is to be understood that the signal 52 (see FIG. 2) received by the array 14 may comprise at least one interference component 13 from at least one respective source of interference 12, and signal components indicative of a target of interest (not shown). The parser 18, parses the data in array 14 into M subarrays, $14_1$ through $14_M$. The M subarrays may be formed contiguously from the array data 14, may overlap, or a combination thereof. In one exemplary embodiment, the M subarrays $14_1$ through $14_M$, are formed contiguously, as depicted in FIG. 3.

The data from each subarray are zero padded, by zero padder 22, such that non zero-padded data elements for a subarray do not positionally overlap with non zero-padded data elements for any other subarray. Zero padded data set 16 represents data 22 from subarray $14_1$ padded with zeros, zero padded data set 18 represent data 23 from subarray $14_2$ padded with zeros, and zero padded data set 20 represent data 24 from subarray $14_M$ padded with zeros. Positionally aligning data sets 16, 18, and 20, such that the first and last data points of each of data sets 16, 18, and 20 are aligned (as shown in FIG. 3), data 22, 23, and 24, do not overlap.

The number of subarrays, M, is determined to ensure that the interference component 13 may be approximated by a plane wave as it impinges upon each of the subarrays $14_1$ through $14_M$. As is well known in the art for a linear array, this approximation is valid if the range to the source of the interference is greater than the length squared of the subarray divided by the wavelength of the frequency of interest. Mathematically, this is represented by the following formula.

$$R > \frac{L^2}{\lambda}, \text{where} \tag{1}$$

R is the range to the source of the interference from the subarray, L is the length of the subarray, and λ is the wavelength of the frequency of interest (e.g., of the frequency associated with the interference component of interest). Denoting the number of elements in the subarray as N and the spacing between the elements (assuming uniform spacing) as d, the length, L, of the subarray may be represented by the following equation.

$$L = (N-1)d \tag{2}$$

Combining equations (1) and (2), and solving for N, the number of elements in the subarray, results in the following equation.

$$N < \frac{\sqrt{R\lambda}}{d} + 1, \text{where} \tag{3}$$

N represents the number of elements in a subarray, R represents the distance from the subarray to the source of the interference, and λ represents a wavelength of a frequency of interest. Similarly, relationships pertaining to the size of the subarray may be determined for other array configurations, such as planar arrays, cylindrical arrays, conformal arrays, and spherical arrays.

Referring again to FIG. 2, zero padded data sets (e.g., 16, 18, and 20) are provided to the transformer 26 via signals $24_1$ through $24_M$. Each of the signals $24_1$ through $24_M$ is transformed independently. In one embodiment, the transformer 26 performs a two-dimensional transform, such as a Fourier transform, or Fast Fourier Transform (FFT), on each zero-padded data set. For example, one dimension may represent space and the other dimension may represent frequency. Each transformed data set is provided to the localizer 30 via signals $28_1$ through $28_M$, respectively. The localizer 30 independently localizes at least one source of interference for each subarray. Localization comprises determining the location of the source of interference. For example, localizer 30 may determine the bearing to each source of interference relative to each subarray, independently for each subarray. The localizer provides data to the amplitude reducer 34 for each subarray via signals $32_1$ through $32_M$, respectively. The amplitude reducer 34 reduces the amplitude of the energy received from the direction of the source (or sources) of interference across one of the transforms dimensions, such as frequency. For example, amplitude reducer 34 may form a notch steered toward each source of interference independently for each of signals $32_1$ through $32_M$. The resultant signals, $38_1$ through $38_M$, are indicative of signals received by each respective subarray with interference suppressed. In one embodiment, the localizer 30 and the amplitude reducer 34 form a beam pattern having a main lobe steered toward a target of interest and having a notch steered toward each source of interference for each subarray. The signals, $38_1$ through $38_M$, are provided to integrator 40. Integrator 40 performs a coherent integration processing of the signals, $38_1$ through $38_M$. The integrated signal 42 is provided to inverse transformer 44 for performing an inverse two-dimensional transform on the signal 42 and providing output signal 48. The output signal 48 is indicative of the signal 52 received by the array 14, having suppressed interference.

Figure 4:
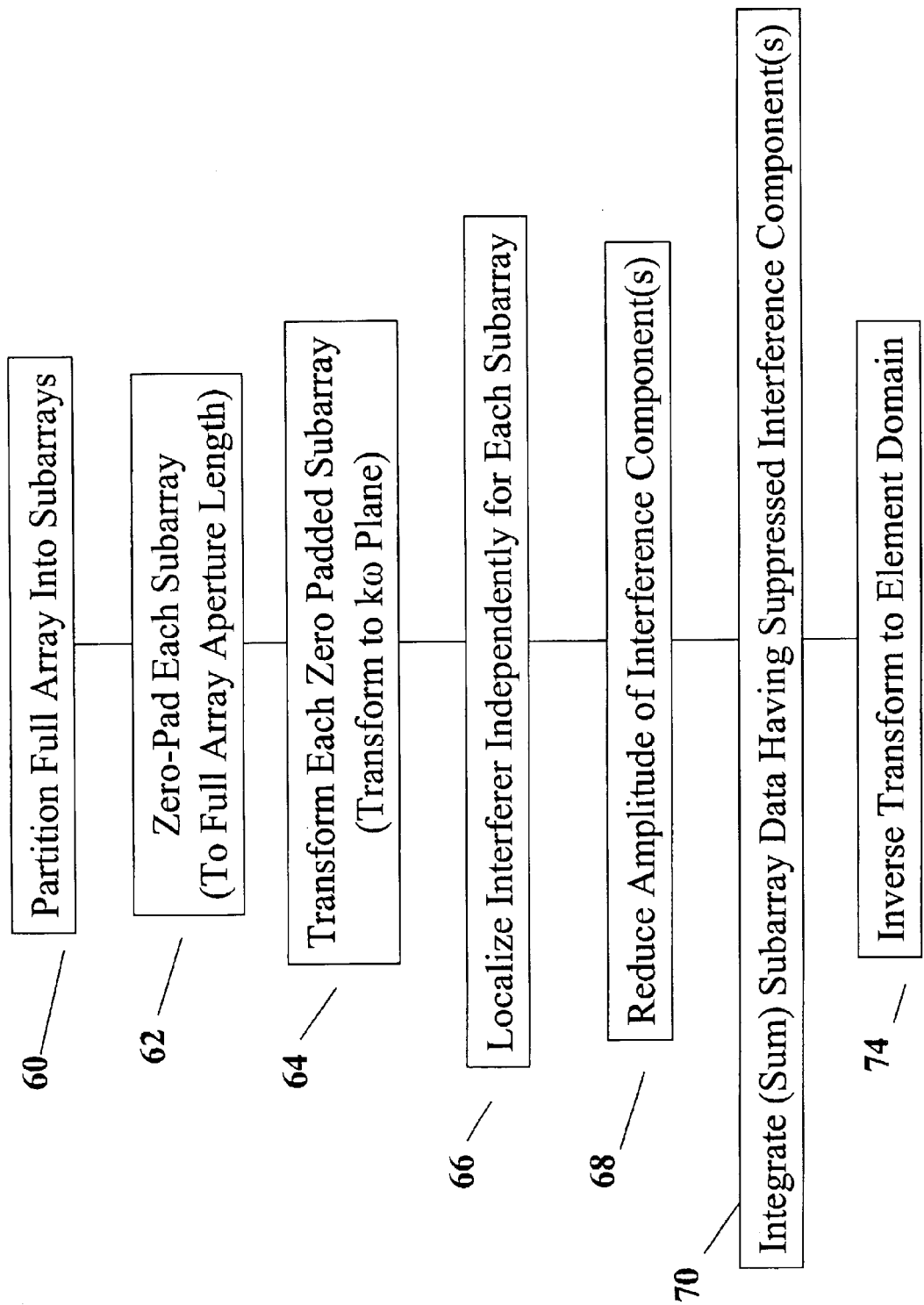
FIG. 4 is a flow diagram of a process for suppressing interference in accordance with the present invention.

FIG. 4 is a flow diagram of an exemplary process for suppressing interference in a signal received by an array of sensor elements. Referring to both FIGS. 2 and 4, the array 14 is partitioned into a plurality of subarrays by array parser 18 at step 60. Data from each parsed subarray is zero padded by optional zero padder 22 at step 62. In one exemplary embodiment, each subarray, $14_1$ through $14_M$, is zero padded to be the same aperture length as the full array 14. That is, each subarray, $14_1$ through $14_M$, is zero padded to result in the number of data elements in each subarray being equal to the number of data elements in the full array 14. The zero-padded data from each subarray, $14_1$ through $14_M$, are transformed at step 64. In one embodiment, the transformer 26 transforms the data in two dimensions, space, k, and frequency, ω. This type of transformation is referred to as converting the data into the kω plane because the transformed data may be plotted on a two-dimensional surface having one axis representing a spatial parameter, k, and the other axis representing frequency, ω. The source of each interferer is localized by localizer 30 at step 66 and the amplitude of the received interference component(s) is reduced by amplitude reducer 34 at step 68. Various schemes for reducing the amplitude of the interference component are envisioned. The amplitude of each interference component may be reduced by replacing the detected amplitude with a predetermined value of amplitude for each frequency bin corresponding to the spatial bin for which an interference component exists. In another embodiment, the amplitude may be reduced by replacing the detected amplitude with a value approximately equal to a local mean amplitude. For example, a local mean value may be calculated by determining the mean amplitude of frequency bins on either side of the frequency bin to be reduced. The detected amplitude may then be reduced to approximately equal this local mean value, or to a weighted local mean value (e.g., multiply the local mean value by a predetermined/calculated value). Also, localization (step 66) and amplitude reduction (68) may be accomplished by forming beam patterns for each subarray, wherein each beam pattern has a main lobe steered toward a target of interest and a notch steered toward each source of interference. The subarrays having respective interference components reduced (suppressed) are integrated by integrator 40 at step 72. This integration process may be a coherent summation of the signals $38_1$ through $38_M$, weighted coherent summation of the signals $38_1$ through $38_M$, or a combination thereof. The integrated subarray data is inverse transformed by inverse transformer 44 at step 74 to provide an output signal 48 indicative of the signal 52 received by the full array 14, having interference component(s) suppressed.

The apparatus and method for suppressing interference as described herein may be embodied in the form of computer-implemented processes and apparatus for practicing those processes. Processing may also be performed by special purpose hardware. The apparatus and method for suppressing interference, as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer processor, the computer processor becomes an apparatus 100 for practicing interference suppression. The apparatus and method for suppressing interference may also be embodied in the form of computer program code, for example, whether stored in a storage medium, loaded into and/or executed by computer processor, or transmitted over some transmission medium, such as over electrical wiring or cabling, through fiber optics, or via electromagnetic radiation, wherein, when the computer program code is loaded into and executed by computer processor, the computer processor becomes an apparatus for practicing the invention. When implemented on a general-purpose processor, the computer program code segments configure the processor to create specific logic circuits.

The technique for suppressing interference as described herein provides the capability to produce notches in a beam pattern for suppressing interference without introducing errors associated with estimating phase shifts. Cross subarray processing is not required. That is, each subarray is processed independently of all other subarrays. Thus, no knowledge of the phase shifts between subarrays is needed. Also, no knowledge of full aperture phase shifts is needed. Eliminating the errors associated with estimating phase shifts tends to produce notches that are more precisely steered and appropriately narrow.

Although illustrated and described herein with reference to certain specific embodiments, the apparatus and method for suppressing interference as described herein is nevertheless not intended to be limited to the details shown. Rather, various modifications may be made in the details within the scope and range of equivalents of the claims and without departing from the spirit of the invention.

What is claimed is:

1. A method for suppressing at least one interference component of a signal received by an array of signal receivers, said method comprising:

parsing said array into a plurality of subarrays;

performing a two-dimensional transform on the signal received from each of said plurality of subarrays;

localizing a source of each of said at least one interference component from the signal received for each of said plurality of subarrays and reducing an amplitude of each of said at least one interference component from each localized source across one of the transform dimensions to provide independently processed subarray signals having reduced at least one interference component; and integrating said plurality of independently processed subarray signals for providing an integrated array signal.

2. A method in accordance with claim 1, further comprising:

inverse transforming said integrated array signal.

3. A method in accordance with claim 1, further comprising zero padding said each of said plurality of subarrays, wherein:

non zero-padded data elements for a subarray do not positionally overlap with non zero-padded data elements for any other subarray.

4. A method in accordance claim 3, wherein data for each subarray is zero padded to result in a number of data elements in each subarray being equal to a number of data elements in said array.

5. A method in accordance with claim 1, wherein said two-dimensional transform provides data indicative of space and frequency.

6. A method in accordance with claim 1, wherein said amplitude of each of said at least one interference component is reduced to at least one of:

a predetermined value; and a value approximately equal to a mean of amplitudes of a predetermined number of data elements on either side of a data element indicative of said source.

7. A method in accordance with claim 1, wherein:

said array is a linear array;

said plurality of subarrays are contiguously partitioned from said linear array; and a number of elements in each subarray is in accordance with:

$$N < \frac{\sqrt{R\lambda}}{d} + 1,$$

wherein:
N represents a number of elements in a subarray;
R represents a distance from a subarray to said source of said signal comprising said interference component;
λ represents a wavelength of a frequency of interest; and
d represents a distance between elements in a subarray.

8. A computer readable medium encoded with a computer program code for directing a processor to process a signal comprising at least one interference component received by an array of signal receivers for suppressing said at least one interference component, said program code comprising:

a first code segment for partitioning said array into a plurality of subarrays;

a second code segment for performing a two-dimensional transform on the signal received from each of said plurality of subarrays;

a third code segment for localizing a source of each of said at least one interference component from the signal received for each of said plurality of subarrays;

a fourth code segment for reducing an amplitude of each of said at least one interference component from each localized source across one of the transform dimensions for each of said plurality of subarrays independently to provide independently processed subarray signals having reduced at least one interference component; and a fifth code segment for integrating said plurality of independently processed subarray signals for providing an integrated array signal.

9. A computer readable medium in accordance with claim 8, said program code further comprising:

a sixth code segment for inverse transforming said integrated array signal.

10. A computer readable medium in accordance with claim 8, said program code further comprising:

a seventh code segment for zero padding each of said plurality of subarrays, wherein non zero-padded data elements for a subarray do not positionally overlap with non zero-padded data elements for any other subarray.

11. A computer readable medium in accordance with claim 10, wherein data for each subarray is zero padded to result in a number of data elements in each subarray being equal to a number of data elements in said array.

12. A computer readable medium in accordance with claim 8, wherein said two-dimensional transform provides data indicative of space and frequency.

13. A computer readable medium in accordance with claim 8, wherein said amplitude of each of said at least one interference component is reduce to at least one of:

a predetermined value; and a value approximately equal to a mean of amplitudes of a predetermined number of data elements on either side of a data element indicative of said source.

14. A computer readable medium in accordance with claim 8, wherein:

said array is a linear array;

said plurality of subarrays are contiguously partitioned from said linear array; and a number of elements in each subarray is in accordance with:

$$N < \frac{\sqrt{R\lambda}}{d} + 1,$$

wherein:
N represents a number of elements in a subarray;
R represents a distance from a subarray to said source of said signal comprising said interference component;
λ represents a wavelength of a frequency of interest; and
d represents a distance between elements in a subarray.

15. An apparatus for suppressing at least one interference component of a signal received by an array of signal receivers, said apparatus comprising:

an array parser for parsing said array into a plurality of subarrays;

a localizer for localizing a source of each of said at least one interference component for each of said plurality of subarrays and for providing a respective plurality of processed subarray signals;

means responsive to said localizer for reducing an amplitude of each of said at least one interference component associated with said processed subarray signals for each of said plurality of subarrays independently; and an integrator for integrating said plurality of independently processed subarray signals for providing an integrated array signal.

16. An apparatus in accordance with claim 15, further comprising:

a zero padder for zero padding data provided by each of said plurality of subarrays;

a two-dimensional transformer for performing a two-dimensional transform on said zero padded data for each of said plurality of subarrays; and an inverse transformer for inverse transforming said integrated array signal.

17. An apparatus in accordance with claim 16, wherein:

non zero-padded data elements for a subarray do not positionally overlap with non zero-padded data elements for any other subarray; and data for each subarray is zero padded to result in a number of data elements in each subarray being equal to a number of data elements in said array.

18. An apparatus in accordance with claim 15, wherein said amplitude of each of said at least one interference component is reduced to at least one of:

a predetermined value; and a value approximately equal to a mean of amplitudes of a predetermined number of data elements on either side of a data element indicative of said source.

19. An apparatus in accordance with claim 15, wherein:

said array is a linear array;

said plurality of subarrays are contiguously partitioned from said linear array; and a number of elements in each subarray is in accordance with:

$$N < \frac{\sqrt{R\lambda}}{d} + 1,$$

wherein:
N represents a number of elements in a subarray;
R represents a distance from a subarray to said source of said signal comprising said interference component;
λ represents a wavelength of a frequency of interest; and
d represents a distance between elements in a subarray.

20. A method for suppressing at least one interference component of a signal received by an array of signal receivers, said method comprising:

parsing said array into a plurality of subarrays each having a length sufficient for processing said at least one interference component as a plane wave impinging upon said plurality of subarrays;

for each of said plurality of subarrays, independently processing the received signals of a subarray by steering a notch in a beam pattern formed in each said subarray toward each source of said at least one interference component for reducing an amplitude of each of said at least one interference component; and integrating said plurality of independently processed subarray signals for providing an integrated array signal.

* * * * *